Sept. 8, 1925.
O. O. ANDERSON
STOCK WATERER
Filed May 28, 1923
1,552,461
2 Sheets-Sheet 2
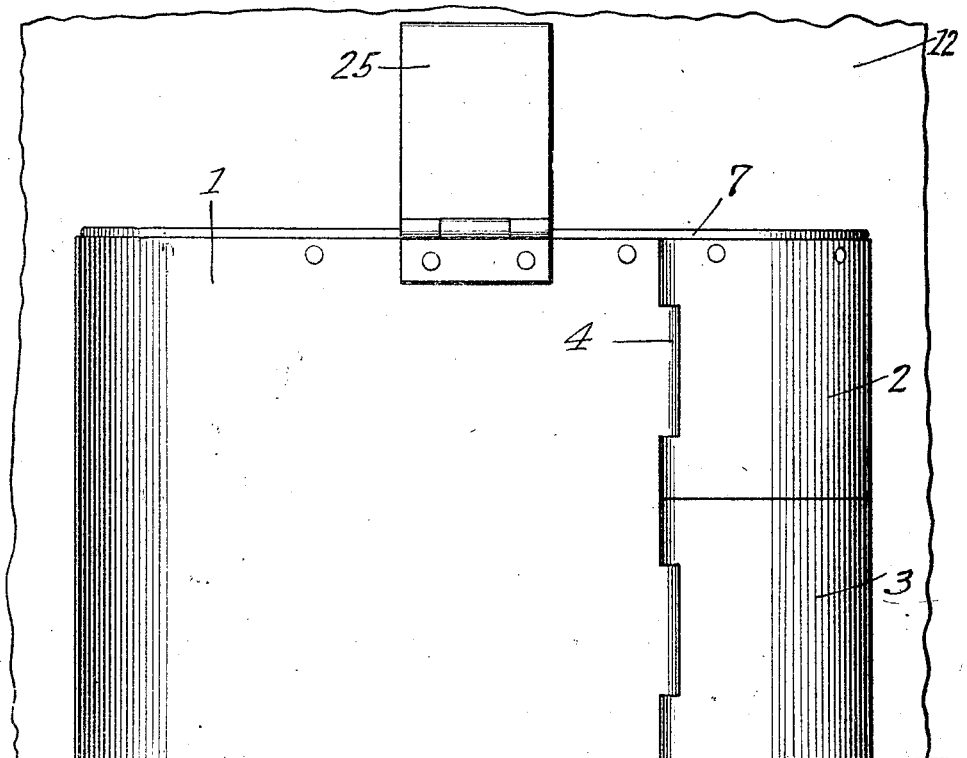
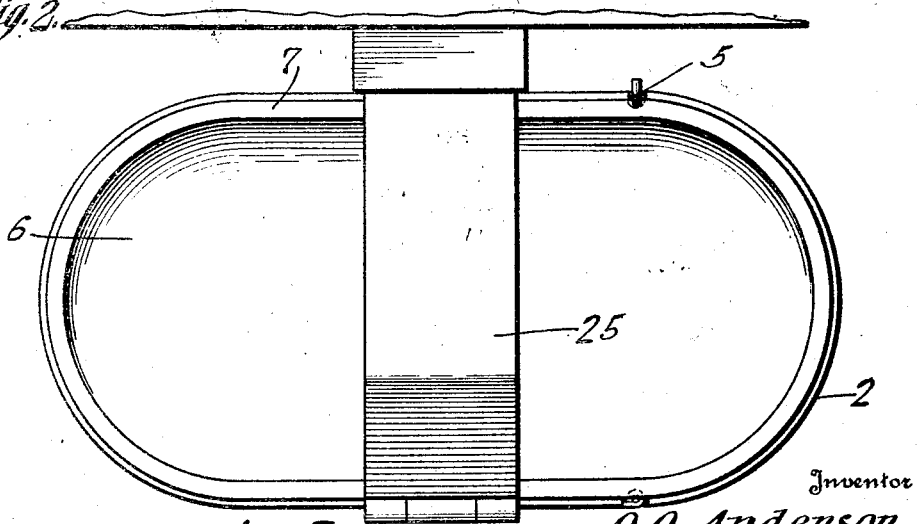
Inventor
O. O. Anderson
Attorneys Patented Sept. 8, 1925.

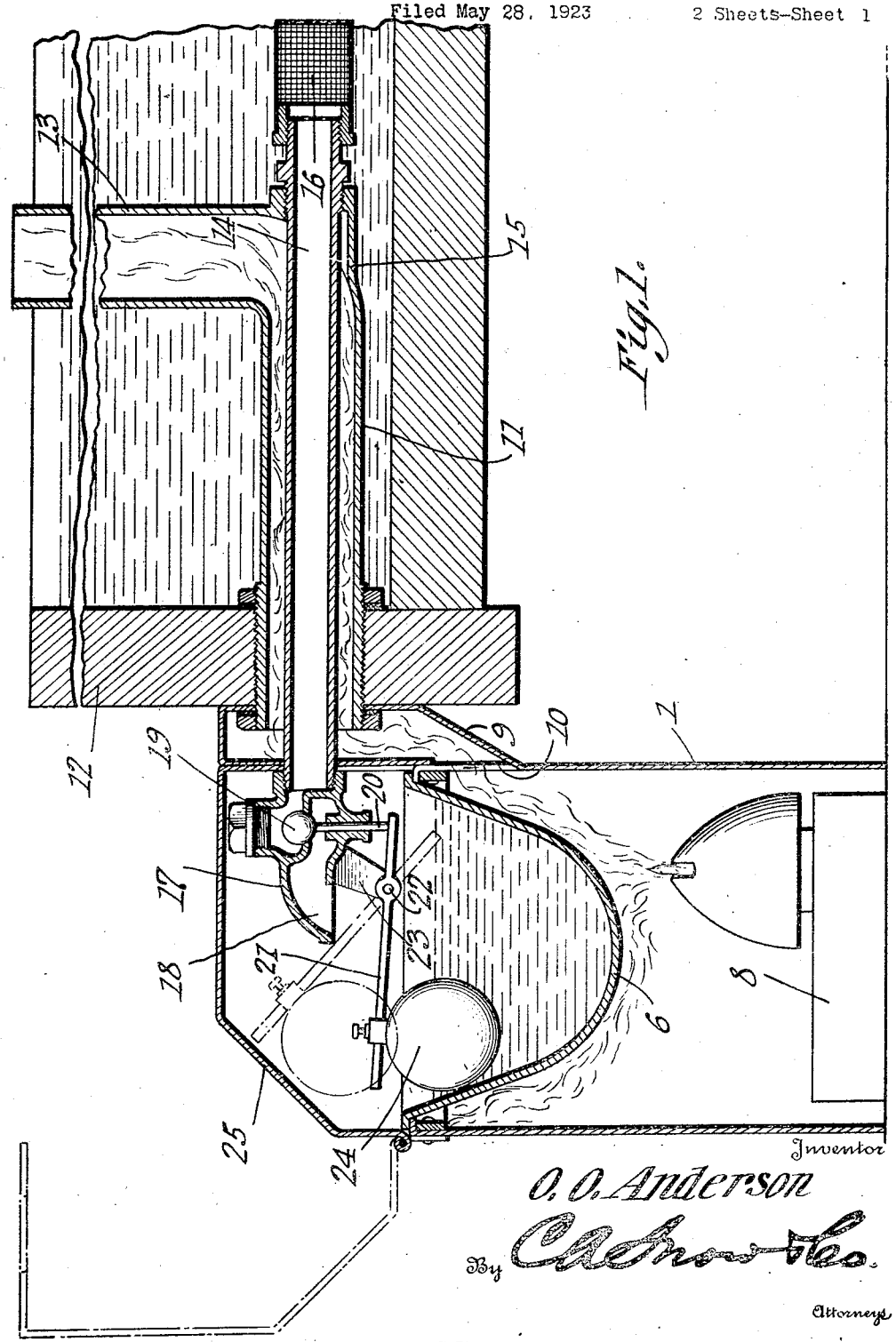

1,552,461

UNITED STATES PATENT OFFICE.

OSCAR O. ANDERSON, OF SIOUX RAPIDS, IOWA.

STOCK WATERER.

Application filed May 28, 1923. Serial No. 642,057.

*To all whom it may concern:*

Be it known that I, OSCAR O. ANDERSON, a citizen of the United States, residing at Sioux Rapids, in the county of Buena Vista and State of Iowa, have invented a new and useful Stock Waterer, of which the following is a specification.

This invention relates to a waterer for stock and more especially for hogs, the principal object being to provide a means whereby the water in the trough and in the supply tank feeding the trough, is prevented from freezing during cold weather, a single heating means, such as a lamp, being utilized for retaining a high temperature in both the trough and the supply tank.

Another object is to provide simple and efficient means for housing the trough, it being possible to remove the trough readily for cleaning it in cold weather without wetting the hands.

Another object is to provide a structure of this character which is simple, durable and compact and will operate efficiently at all times.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings—

Figure 1 is a central longitudinal section through the structure, a portion of the supply tank being broken away.

Fig. 2 is a front elevation of the trough housing.

Fig. 3 is a plan view of the structure shown in Fig. 2.

Referring to the figures by characters of reference 1 designates a housing open at the top and provided, at one end, with superposed doors 2 and 3 hingedly mounted as at 4 and adapted to be held closed by means of a pin 5 or other suitable means. The trough 6 of any suitable material is adapted to be supported by the upper edge of the wall of housing 1, this trough being provided with a flange 7 extending therearound for resting on the wall. A lamp 8 or other suitable heater is located in the housing 1 below the trough and can ordinarily be removed by opening the lower door 3 although should the housing be partly buried in the ground, it would be possible to dispense with the door 3 and to obtain access to the heater through the open door 2. By opening the door 2 it is possible to slide the trough 6 into and out of position so that it can be cleaned readily. One wall of the housing 1 is provided with a box-like extension 9 adjacent the top thereof, there being an opening 10 whereby hot products of combustion can pass from the heater 8 into the lower portion of the extension 9. A flue 11 opens into the extension 9 and is adapted to be secured within one wall of a supply tank 12. This flue has an upwardly extending portion 13 within the tank and opening at its upper end above the top of the tank. Thus it will be seen that smoke or other hot products of combustion as well as air heated in the housing can flow freely into extension 9 and through the flue 11 to the upper open end thereof. Consequently the contents of the trough 6 as well as the contents of the tank 12 can be heated to prevent freezing.

The water supply pipe has been indicated at 14. This pipe is extended through the elbow portion 15 of flue 11, one end of the pipe being preferably provided with a strainer 16 whereby foreign substances are prevented from entering the pipe 14 from the tank 12. The other end of pipe 14 opens into the upper portion of the housing 1 where it is provided with a valve casing 17. This casing has an outlet opening 18 overhanging the trough 6. A valve 19 is mounted in the casing and has a depending stem 20 supported above one end of a lever 21. Said lever is journaled at 22 between ears 23 extending downwardly from the valve casing 17. The other end of lever 21 has a float 24 projecting into the trough 6.

It will be apparent from the foregoing that when the trough 6 is filled, float 24 will be supported in raised position, thereby allowing the valve 19 to rest on its seat and cut off the supply of water to the outlet 18. When the level of the contents of the trough is lowered the float 24 will act as a weight and cause lever 21 to thrust through the stem 20 so as to unseat the valve 19. Thus water will flow through the pipe 14 from tank 12 and into the trough 6 until the normal level has been reached.

As before pointed out, the heat generated in the housing 1 will keep up the temperature of the contents of the trough as well as of the tank 12.

When it is desired to remove the trough 6 for cleaning it as before explained, it is of course necessary first to lift the float 24 out of the trough.

A cover or partition strip 25 is hingedly connected to the middle portion of the front of housing 1 and extends over the float, its lever, and the valve casing 17. Thus the stock, when using the trough, will not come against the float and break or otherwise injure the mechanism. This shield or cover strip can be moved readily to open position as shown by broken lines in Fig. 1.

What is claimed is:—

1. The combination with a supply tank, a flue supported therein and opening upwardly above the level of the contents of the tank, and a feed pipe extending through a portion of the flue and communicating with the interior of the tank, of a housing, an extension thereon communicating with the flue and with the housing, a normally closed door upon the housing, a trough supported by the housing and removable through the door, the space below the trough opening into the extension, a heater within the housing, a casing communicating with the feed pipe and opening downwardly into the trough, and a float valve for controlling the flow of liquid through the casing into the trough.

2. The combination with a supply tank, a flue supported therein and opening upwardly above the level of the contents of the tank, and a feed pipe extending through a portion of the flue and communicating with the interior of the tank, of a housing, an extension thereon communicating with the flue and with the housing, a normally closed door upon the housing, a trough supported by the housing and removable through the door, the space below the trough opening into the extension, a heater within the housing, a casing communicating with the feed pipe and opening downwardly into the trough, a float valve for controlling the flow of liquid through the casing into the trough, and a shield strip movably connected to the housing and overhanging the valve casing and float valve.

In testimony that I claim the foregoing as my own, I have hereto affixed my signature.

OSCAR O. ANDERSON.